Patented Apr. 28, 1931

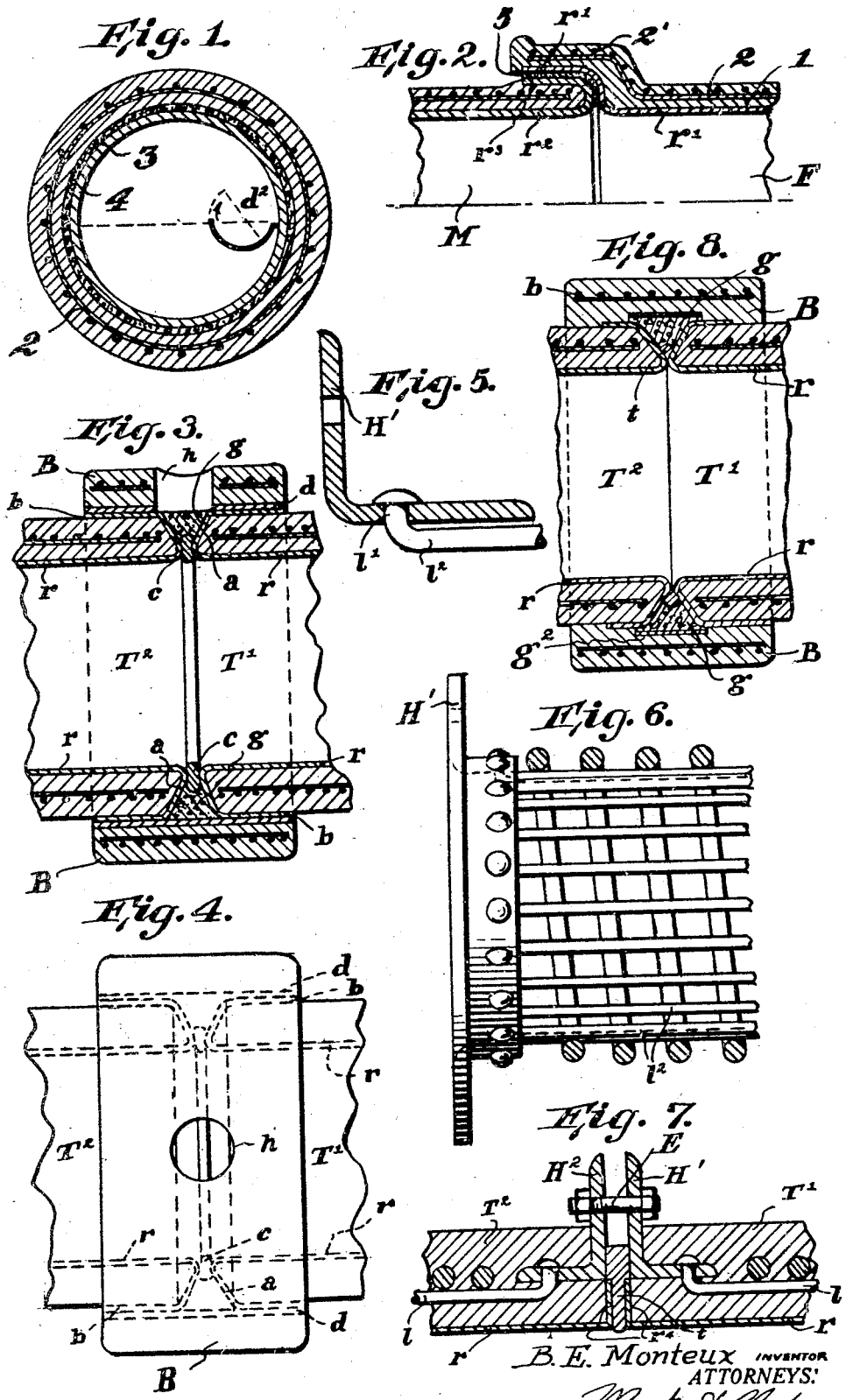

1,802,665

UNITED STATES PATENT OFFICE

BENJAMIN EMILE MONTEUX, OF PARIS, FRANCE, ASSIGNOR OF ONE-HALF TO PAUL LOUIS DURAND, OF PARIS, FRANCE

PIPE OF CEMENT OR REENFORCED CEMENT

Application filed January 10, 1929, Serial No. 331,589, and in France January 18, 1928.

The known pipes constructed of cement or of reenforced cement are not water tight even at low pressures.

It has been attempted to remedy this serious drawback by various means:

1, by increasing the density of the wall of the pipe either by ramming the material tight or by manufacturing the pipe by a centrifugal process.

These suggested remedies have, however, been tried without success.

2, by inserting in the wall of the pipe a thin sheet of steel bent round and welded by the autogenous process. This process, however, necessitates manufacture of an exacting, complicated and consequently expensive kind and the efficiency of the result depends on the autogenous welding being carried out in a reliable manner.

The principal feature of the present invention resides in producing water tight pipes by a process which consists in coating the interior wall of the pipe with a layer or lining which adheres to the said wall by penetrating into the pores of the cement or concrete. The pipes constructed in this manner offer the following advantages:

1. That they are absolutely fluid tight under any pressures to which they may be submitted, as are also the joints of said pipes.

2. That they possess a degree of elasticity which renders it possible for them to expand and contract, under the action of the pressures and of the heat.

Moreover the lining or layer preserves the purity and the taste of the water, inasmuch as the chemical compounds employed for sterilization have no action on it, since the said layer or coating insulates the cement or mortar from the water, which otherwise would dissolve or attack it, according to its state and its composition.

In order to obtain this result according to the invention such materials are employed which are known by the generic name of liquid bitumen.

It is preferable to employ as the liquid bitumen the product known as "bitumuls" which is an emulsion in pure water of pure bitumen having been reduced to the colloidal state.

By dissociation the said emulsion reduces itself to water and pure bitumen. The dissociation takes place more or less quickly on contact with the cement or the mortar or the cement concrete, which assimilate the water by affinity, and a thin coating of pure bitumen is thus deposited on the inner wall of the pipe.

In the process according to the present invention rapid dissociation of the emulsion in the pipe is obtained, together with intimate penetration of the bitumen into all the porosities of the concrete or of the cement, whereby the wall of the pipe is rendered impermeable to water.

The necessary separation may be effected by any suitable means, particularly by the action of centrifugal force.

The pipe itself, before being coated or lined, is manufactured from concrete or cement, reenforced or not, by centrifugal treatment according to any of the usual processes.

The further operation can then be conducted either by a wet method or by a dry method, as follows:

1. When operating with the wet method:

The pipe proper having been produced and the residual water ejected from the mould, the quantity of "bitumuls" necessary for the water tight coating or lining is introduced into the pipe which is still slightly damp.

After the introduction of the charge, the pipe is set in rotation.

The emulsion, being in contact with the concrete or cement surface and being subjected to the action of the centrifugal force, rapidly dissociates into impalpable particles of pure bitumen and of water. The bituminous molecules are thrown violently against the wall of the pipe, whereby they penetrate into the interstices of the concrete or cement, adhere there to each granule of the latter and cover the said concrete to a greater or lesser depth with a layer which fills up the porosities of the wall and forms a first inside layer, consisting of a conglomerate of the concrete or cement and the bitumen and constituting in fact a special material. This layer is the penetration layer, which is called the conglomerate layer.

The invention is illustrated in the accompanying drawing, and

Figure 1 is a sectional view of a pipe of cement concrete according to the invention;

Figure 2 is a longitudinal section of a form of joint;

Figure 3 is a longitudinal section of another form of joint;

Figure 4 is a plan view seen from above corresponding to Figure 3;

Figures 5 and 6 show the attachment of the rods to the angle iron ring of the joint shown in Figure 7; and Figure 7 is a half longitudinal section of a form of joint.

Figure 8 is a view similar to Figure 3.

Fig. 1 of the accompanying drawings shows in section a pipe of cement concrete 1, together with its reinforcment 2 and a penetration or conglomerate layer 3 of bitumen and cement. This latter layer must have a smooth inner surface and serves as a support and a binding means for the coating of pure bitumen, which, without the said layer, would not adhere to the cement because the pure bitumen must be heated to 180° C. to be made liquid and has in that state no adherence.

After the residual water of the emulsion has been removed a second quantity of "bitumuls" is introduced into the pipe, which second quantity serves to form a lining of 1, 2 or 3 mm. thickness according to requirements.

The pipe is set in rotation; the centrifugal force breaks up the emulsion, and the pure bitumen forms on the "conglomerate layer" 3 a fluid tight, solid, elastic and continuous lining.

This lining, which is inseparably connected to the conglomerate layer 3 forms a "working layer" 4 of pure bitumen.

2. When operating with the dry method:

The operations are, in principle, the same as in the preceding method. They only differ therefrom in the quantities of "bitumuls" employed and in the control of the speeds of rotation.

It is likewise possible to obtain in a single operation the simultaneous formation of the "conglomerate layer" 3 and the "working layer" 4 by putting into the mill the quantity of "bitumuls" necessary for the lining.

Pouring the bitumen into the pipe while it is at rest and then setting the pipe in motion is an elementary process.

It is necessary to obtain uniformity in the layer of bitumen, i. e. exactly equal distribution and equal compression everywhere on the wall and for this purpose the bitumen is caused to pass into the pipe during rotation gradually in a continuous and regular manner.

With this object in view the liquid bitumen is contained in a gutter $d^2$ which is introduced into the pipe near the inner wall. When the pipe is at its normal speed of rotation, the gutter empties itself gradually. A certain relation exists between the speed at which the bitumen flows out and the speed of rotation of the pipe. It is obvious that the rotation of the gutter may be effected by various means. For example, the gutter may be fixed to a cylinder of sheet metal which, on being turned around its axis either by means of a crank or automatically, carries the gutter with it, the latter also revolving around its axis. The turning of the gutter is an essential condition for a regular discharge of the bitumen.

In cases where the pipe is not manufactured by centrifugal action, the lining with "bitumuls" can be effected by spraying on to the wall or by the simple application of several superposed coatings. The result obtained is, however, not so uniform as that obtained when centrifugal force is employed.

For the purpose of making joints in the fluid tight pipes manufactured according to the present invention, the three methods known respectively as the spigot and faucet joint, the ring joint, and the flanged joint, may be employed.

The first method is illustrated in Fig. 2 in longitudinal section through the axis $x$—$x$ of the pipe. The female end or faucet F is furnished with a fluid tight coating $r_1$ over the whole of its extent. On the male end or spigot M, a coating $r_2$ extends up to $r_3$ on the outside on the part engaging with the female end. This external coating $r_3$ is obtained by spraying or by simple application.

Between the two aforesaid ends at 5 pure hot bitumen is poured in. The joint is then completed by caulking of a bituminous strip or a ring of india rubber, this latter material possessing the property of adhering to the bitumen.

The faucet may, if desired, be reenforced as indicated at 2' on the right hand side of the joint.

In the ring method of making a joint the walls of the pipe and of the ring form a special aggregate as shown in longitudinal section in Fig. 3, and in Fig. 4 which is a plan view seen from above corresponding to Fig. 3.

The walls of the pipes $T_1$ and $T_2$ are provided at their ends with bevelled surfaces $a$, which are covered by the fluid tight coating $r$, this latter extending up to the point $b$ on the external surface and thus over the length of the pipe which is to be covered by the ring.

In consequence of this arrangement an annular groove is formed between the two pipes which are placed end to end, and into this groove hot bitumen $g$ is poured, said bitumen adhering to the bitumen in the groove and thus ensuring the fluid tightness of the joint.

In order to ensure contact and intimate connection between the fluid tight coatings $r$ $r$, a bituminous strip or ring C is placed at the bottom of the aforesaid annular groove.

The space between the ends of the pipes, which amounts as a rule to about 2 to 4 mm. allows of the expansions and contractions of the pipes under the influence of variations of temperature.

The ring member B insures the efficient connection of the two pipes, consolidates the joint and allows of bitumen being poured into the groove. For this purpose, the said ring B is constructed in the form of a member of reenforced concrete provided on its interior wall with a fluid tight coating $d$. The said ring extends beyond each side of the groove thus covering both the pipes.

The ring is provided in its middle portion with a cylindrical hole $h$ having a slightly greater diameter at the opening of the groove. Through this hole the hot bitumen $g$ is poured. For this purpose the ring is placed in such a position that the hole is at the upper part of the pipes opposite to the groove. A fluid tight joint is thus obtained which permanently connects the two pipes. The hole is afterwards closed by means of cement.

In the arrangement shown in Fig. 8 the ring is moulded in place directly into the pipes. These latter having been placed end to end as hereinbefore described, a band $t$ $t$ of bituminous canvas or like covering is laid around the groove, and the hot bitumen $g$ is poured in through a hole $h$, as in Fig. 3 at the upper part. The canvas or covering $t$ $t$ is thus sealed down in the groove and the hole closed. The reinforcement is placed on the two pipes covering them over a certain length and a metallic moulding $g^2$ surrounds the reinforcement. The ring B thus formed then insures the rigid attachment of the two pipes.

An angle iron flanged joint is shown in Figs. 5, 6 and 7.

Fig. 5 shows the attachment of a rod $1^2$ to the angle-iron ring $H^1$.

Fig. 6 shows the whole arrangement with the angle-iron ring $H^1$ connected to the rods $1^2$.

Fig. 7 is a half section taken axially showing the finished joint.

This joint is made up of two angle-irons $H_1$ $H_2$ which are bent round and welded and are arranged one at each end of the pipe. The said angle-irons are rigidly connected to the pipe by anchorage in the reenforcement (Figs. 5 and 6). For this purpose, the reenforcing rods $1^2$, the ends of which are bent at right angles, are passed through holes bored in the angle irons at $1^1$ and are fixed in position by caulking or riveting.

The angle irons thus form annular flanges which serve to connect the two tubes by means of nuts and bolts E (Fig. 7).

In order to render the joint fluid tight the coating $r$ of "bitumuls" is extended as shown at $r_4$ up to the angle irons $H^1$ and $H^2$ (Figs. 7). Between the flanges an india-rubber ring $t$ is placed which, being pressed between the said flanges, adheres to the bitumen of the wall and thus ensures the fluid tightness of the joint, whatever the pressure may be.

The various methods of carrying out the invention set forth above are only given by way of example and are not of a limiting nature.

Claims—

1. An article of manufacture comprising a concrete outer pipe and a lining of said pipe consisting of pure bitumen having the characteristic of "bitumuls," said lining being water-tight and resilient to all pressures, a conglomerate layer consisting of cement and bitumen arranged between said pipe and the lining, said conglomerate layer being intimately connected with the adjacent surface both of the pipe and the lining, a ring joint for the adjacent ends of two pipes provided with beveled edges in order to form a groove between them, said lining extending over the beveled edges and a portion of the outer surface of the pipe; said ring joint including an annular member fitting tightly over said outer lining and a ring of bituminous material filling said groove between the pipe ends.

2. An article of manufacture comprising a concrete outer pipe and a lining of said pipe consisting of pure bitumen having the characteristic of "bitumuls," said lining being water-tight and resilient to all pressures, a ring joint for the adjacent ends of two pipes provided with beveled edges in order to form a groove between them, said lining extending over the beveled edges and a portion of the outer surface of the pipe; said ring joint including an annular member fitting tightly over said outer lining and a ring of flexible material filling said groove between the pipe ends.

3. An article of manufacture comprising a concrete outer pipe and a lining of said pipe consisting of pure bitumen having the characteristic of "bitumuls," said lining being water-tight and resilient to all pressures, a ring joint for the adjacent ends of two pipes provided with beveled edges in order to form a groove between them, said lining extending over the beveled edges and a portion of the outer surface of the pipe; said ring joint including an annular member fitting tightly over said outer lining and a ring of bituminous material filling said groove between the pipe ends, an annular strip inserted in said groove between the edges of the adjacent pipes.

In testimony whereof he has signed this specification.

BENJAMIN EMILE MONTEUX.